(12) United States Patent
Lin et al.

(10) Patent No.: US 8,289,485 B2
(45) Date of Patent: Oct. 16, 2012

(54) LIQUID CRYSTAL DISPLAY PANEL AND METHOD FOR MANUFACTURING THEREOF AND LIQUID CRYSTAL DISPLAY INCORPORATING THE SAME

(75) Inventors: Tzu-Yuan Lin, Taipei (TW); Po-Kai Liu, Hsinchu (TW); Ren-Hung Huang, Banciao (TW); Po-Chang Wu, Jiading Township, Kaohsiung County (TW); Fu-Cheng Sie, Taichung County (TW); Chun-Hung Chiang, Gueiren Township, Tainan County (TW); Shune-Long Wu, Taipei (TW); Jin-Jei Wu, Taipei (TW); Po-Lun Chen, Chiayi (TW)

(73) Assignee: AU Optronics Corp., Hsin-Chu (TW)

( * ) Notice: Subject to any disclaimer, the term of this patent is extended or adjusted under 35 U.S.C. 154(b) by 538 days.

(21) Appl. No.: 12/578,960

(22) Filed: Oct. 14, 2009

(65) Prior Publication Data
US 2010/0039597 A1    Feb. 18, 2010

Related U.S. Application Data

(62) Division of application No. 11/552,999, filed on Oct. 26, 2006, now Pat. No. 7,623,209.

(30) Foreign Application Priority Data

Nov. 3, 2005  (TW) ............................. 94138634 A
Mar. 16, 2006 (TW) ............................. 95109059 A

(51) Int. Cl.
*G02F 1/1337*  (2006.01)
*G02F 1/1343*  (2006.01)

(52) U.S. Cl. ......... 349/123; 349/130; 349/131; 349/141
(58) Field of Classification Search ............. 349/123, 349/130, 141
See application file for complete search history.

(56) References Cited

U.S. PATENT DOCUMENTS 6,144,434 A    11/2000   Kim et al.
(Continued)

FOREIGN PATENT DOCUMENTS

CN    1326560    12/2001
(Continued)

OTHER PUBLICATIONS

Chinese language Notice of Allowance dated Jan. 29, 2010.
(Continued)

*Primary Examiner* — Huyen Ngo
(74) *Attorney, Agent, or Firm* — Thomas|Kayden

(57) ABSTRACT

A liquid crystal display panel including several first electrode portions, several second electrode portions, and a smectic liquid crystal layer is provided. The first electrode portions and the second electrode portions are disposed on a first substrate. When an AC voltage is applied on the first electrode portions and the second electrode portions, the direction of a horizontal electrical field formed between each first electrode portion and the adjacent second electrode portion is parallel to the surface of the first substrate. The smectic liquid crystal layer is interposed between the first substrate and a second substrate. During the phase change of a liquid crystal molecule of the smectic liquid crystal layer, the horizontal electrical field generated by applying the AC voltage on the first electrode portions and the second electrode portions facilitates the alignment of the liquid crystal molecule of the smectic liquid crystal layer.

4 Claims, 11 Drawing Sheets

U.S. PATENT DOCUMENTS

| | | |
|---|---|---|
| 6,177,973 B1 | 1/2001 | Lee et al. |
| 6,181,402 B1 | 1/2001 | Shim et al. |
| 6,760,088 B2 | 7/2004 | Choi et al. |
| 6,762,812 B2 | 7/2004 | Hasegawa et al. |
| 6,768,527 B2 | 7/2004 | Choi et al. |
| 6,774,976 B2 | 8/2004 | Wang et al. |
| 7,518,700 B2 | 4/2009 | Shibahara et al. |
| 2005/0151912 A1 | 7/2005 | Miyachi et al. |
| 2005/0190329 A1* | 9/2005 | Okumura ............... 349/123 |
| 2005/0248702 A1 | 11/2005 | Hoshino |
| 2006/0044503 A1* | 3/2006 | Ham et al. ............. 349/141 |
| 2008/0218646 A1* | 9/2008 | Miyachi et al. ......... 349/37 |

FOREIGN PATENT DOCUMENTS

| | | |
|---|---|---|
| CN | 1517767 | 8/2004 |
| CN | 1645225 | 7/2005 |
| CN | 1677213 | 10/2005 |
| TW | 550423 | 9/2003 |

OTHER PUBLICATIONS

English language translation of Notice of Allowance.

English language translation of abstract of TW 550423 (published Sep. 1, 2003).

* cited by examiner

LIQUID CRYSTAL DISPLAY PANEL AND METHOD FOR MANUFACTURING THEREOF AND LIQUID CRYSTAL DISPLAY INCORPORATING THE SAME

This is a Divisional of U.S. application Ser. No. 11/552,999, filed Oct. 26, 2006 and claim the benefits of Taiwan application Serial No. 94138634, filed Nov. 3, 2005 and Serial No. 95109059, filed Mar. 16, 2006, the subject matter of which is incorporated herein by reference.

BACKGROUND OF THE INVENTION

1. Field of the Invention

The present invention relates in general to a liquid crystal display (LCD) panel and a method for manufacturing thereof and an LCD incorporating the same, and more particularly, to an LCD panel and a manufacturing method thereof and an LCD incorporating the same which apply an AC voltage to facilitate the alignment of a liquid crystal molecule of the smectic liquid crystal layer during the phase change of the liquid crystal molecule of the smectic liquid crystal layer and adopt the design of liquid crystal vertical alignment.

2. Description of the Related Art

In a conventional ferroelectric liquid crystal (FLC) display panel, the alignment directional of the smectic liquid crystal layer is processed using a hard rubbing method. Therefore, zigzag wall defect easily occurs in the arrangement of the liquid crystal of conventional smectic liquid crystal layer. Thus, conventional FLC display panel will have severe light leakage due to the zigzag wall defect of arrangement, reducing the contrast of the FLC display panel.

Moreover, the defect of arrangement occurring in conventional liquid crystal of the smectic liquid crystal layer can not be restored by itself unless the liquid crystal is rearranged during the cooling process of the liquid crystal. Although the zigzag wall defect of arrangement can be reduced during the slow cooling process of the liquid crystal of conventional smectic liquid crystal layer, the cooling process of the FLC display panel is long time-consuming.

An generally user is unable to eliminate the defect of arrangement of the liquid crystal of the smectic liquid crystal layer resulted when the FLC display panel is mechanically deformed, thereby affecting the user's acceptance of the FLC display panel and user's feeling.

Besides, the thickness of the smectic liquid crystal layer of a conventional FLC display panel is approximately equal to 2 μm. Therefore, a higher standard expected of the design in the cell gap between the top and the bottom substrates and the surface of the substrates would result in a more difficult manufacturing process of the conventional FLC display panel.

Moreover, the conventional FLC display panel uses the photo-electrically bi-stable behavior of the liquid crystal of the smectic liquid crystal layer to display. There are three methods of gray level display disclosed below.

The first method is a pixel area dividing method. The disadvantage is that the more pixels are divided so as to the yield will be lower.

The second method is a frame time dividing method. The disadvantage is that high-speed drive circuit is required in dividing the gray level.

The third method is a drive voltage dividing method. The disadvantage is that both the waveform of the drive voltage and the drive circuit become very complicated when a voltage is used to drive the LCD panel having photo-electrically bi-stable behavior.

SUMMARY OF THE INVENTION

It is therefore an object of the present invention to provide a liquid crystal display (LCD) panel and a manufacturing method thereof and an LCD incorporating the same. The design of applying an AC voltage to facilitate the alignment of a liquid crystal molecule of a smectic liquid crystal layer during the phase change of the liquid crystal molecule of the smectic liquid crystal layer and adopting the liquid crystal vertical alignment enables the liquid crystal molecule of the smectic liquid crystal layer to be uniformly arranged and aligned. Therefore, the liquid crystal of the smectic liquid crystal layer is free of zigzag wall defect of arrangement, and the LCD panel is prevented from light leakage occurring due to the zigzag wall. Consequently, the contrast of LCD panel will be improved.

Moreover, the LCD panel of the present invention adopts the design of liquid crystal vertical alignment, so the smectic liquid crystal layer of the present invention is thicker than the smectic liquid crystal layer of a conventional FLC display panel, not only increasing the cell gap between the top and the bottom substrates as well as the flexibility in the design of he surface of the substrate, but also simplifying the manufacturing technology of LCD panel.

Furthermore, the LCD panel of the present invention adopts the design of dual vertical alignment with a strongly anchoring energy and a weakly anchoring energy, single vertical alignment, or polymer network inside the smectic liquid crystal layer, so that the voltage applied on the LCD panel is apparently reduced.

Other objects, features, and advantages of the present invention will become apparent from the following detailed description of the preferred but non-limiting embodiments. The following description is made with reference to the accompanying drawings.

BRIEF DESCRIPTION OF THE DRAWINGS

The accompanying drawings, which are incorporated in and constitute a part of the specification, illustrate an embodiment of the invention, and, together with the description, serve to explain the principle of the invention.

DETAILED DESCRIPTION OF THE INVENTION

Figure 1:
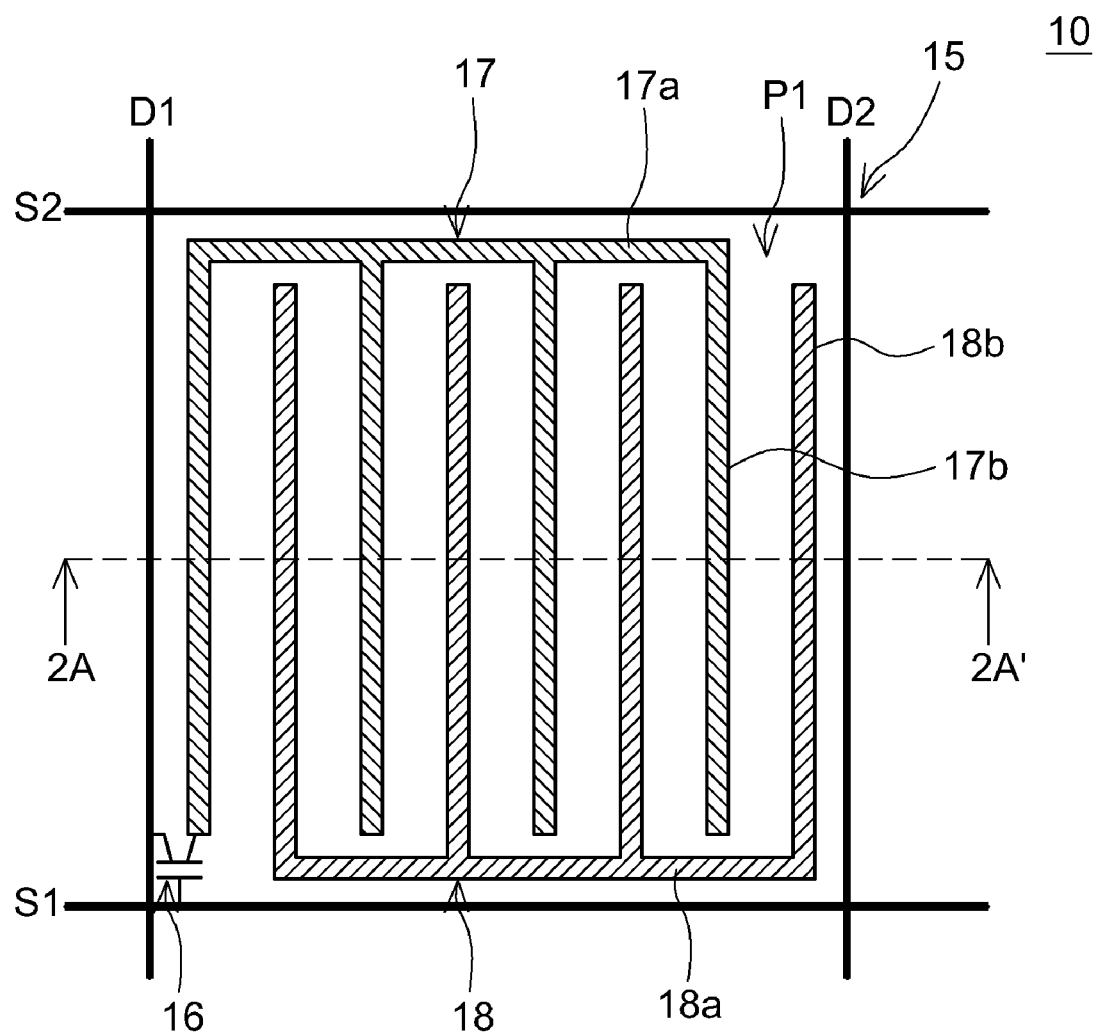
FIG. 1 is a top view of the circuit structure of an LCD panel according to a first embodiment of the present invention.

The present invention now will be described more fully hereinafter with reference to the accompanying drawings, in which preferred embodiments of the invention are shown. This invention may, however, be embodied in many different forms and should not be construed as limited to the embodiments set forth herein. In the drawings, the thickness of layers and regions are exaggerated for clarity. Like numerals refer to like elements throughout.

First Embodiment

Figure 2A:
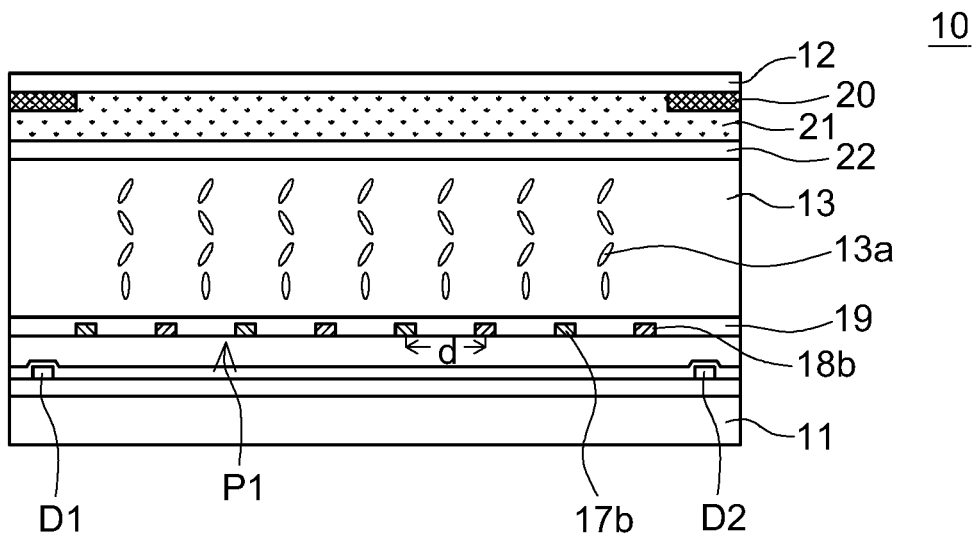
FIG. 2A is a diagram showing partial cross-sectional structure of the LCD panel along the cross-sectional line 2A-2A' of FIG. 1.
Figure 2B:
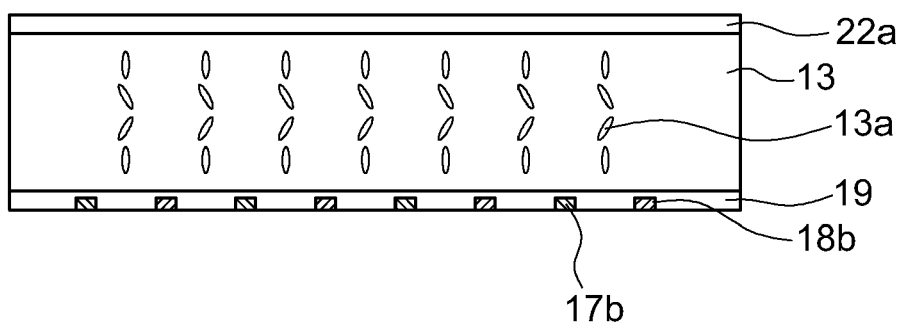
FIG. 2B is a diagram showing the arrangement of the liquid crystal molecules when the first vertical alignment film and the second vertical alignment film have strongly anchoring energies.

Referring to FIGS. 1~2A, FIG. 1 is a top view of the circuit structure of the LCD panel according to the first embodiment of the present invention, and FIG. 2A is a diagram showing partial cross-sectional structure of the LCD panel along the cross-sectional line 2A-2A' of FIG. 1. In FIGS. 1, 2A, 2B, the LCD panel 10 includes a first substrate 11, an active matrix 15, a first electrode 17, a second electrode 18, a first vertical alignment film 19, a second vertical alignment film 22 and a smectic liquid crystal layer 13. The active matrix 15 having one or more switch devices and one or more pixels is disposed on the first substrate 11. Each pixel is defined by two adjacent scan lines (or gate lines) and two adjacent data lines (or source lines) disposed on the first substrate 11. In the present embodiment of the invention, the active matrix 15 is exemplified by a pixel P1. The pixel P1 is defined by a first scan line S1 and its adjacent second scan line S2 as well as a first data line D1 and its adjacent second data line D2. The switch device 16 is positioned on the first substrate 11 and disposed inside the pixel P1. Moreover, the switch device 16 is electrically connected to the first scan line S1 and the first data line D1. The switch device 16 is a transistor such as a thin film transistor (TFT) for instance.

The first electrode 17 positioned on the first substrate 11 is disposed inside the pixel P1 and electrically connected to the switch device 16. The first electrode 17 has one or more first electrode connecting portions 17a and several first electrode portions 17b parallel to one another. Here, a first electrode connecting portion 17a is electrically connected to the first electrode portions 17b for illustration. The first electrode connecting portion 17a is vertically connected to the first electrode portions 17b. The second electrode 18 positioned on the first substrate 11 is disposed inside the pixel P1 and has one or more second electrode connecting portion 18a and several second electrode portion 18b parallel to one another. Here, a second electrode connecting portion 18a is electrically connected to the second electrode portions 18b for illustration. The second electrode connecting portion 18a is vertically connected to the second electrode portions 18b. The first electrode connecting portion 17a is parallel to the second electrode connecting portion 18a. The second electrode portions 18b are parallel to and spaced by the first electrode portions 17b. A predetermined distance d is formed between each second electrode portion 18b and its adjacent first electrode portion 17b which are alternately spaced. Each first electrode portion 17b and its adjacent second electrode portion 18b are spaced by the predetermined distance d. The predetermined distance d substantially ranges from about 5 to about 50 μm. In the present embodiment, the first electrode 17 and the second electrode 18 are like two mutually spaced combs positioned face to face. When an AC voltage is applied on the first electrode 17 and the second electrode 18 to change the polarity of the first electrode 17 and the second electrode 18, the direction of the horizontal electrical field formed between any of the first electrode portions 17b and its adjacent the second electrode portion 18b is parallel to the surface of the first substrate 11. In other words, each second electrode portion 18b is inter-spaced by each first electrode portion 17b and each second electrode portion 18b and the adjacent first electrode portion 17b is separated by a predetermined distance d. When an AC voltage is applied on the first electrode 17 and the second electrode 18, the direction of a horizontal electrical field formed between each first electrode portion 17b and the adjacent second electrode portion 18b is substantially parallel to the surface of the first substrate 11.

The first vertical alignment film 19 is disposed on the first substrate 11 and covers the first electrode 17 and the second electrode 18. The second vertical alignment film 22 is disposed on a second substrate 12.

The smectic liquid crystal layer 13 is disposed between the first substrate 11 and the second substrate 12, and is positioned between the first vertical alignment film 19 and the second vertical alignment film 22. The smectic liquid crystal layer 13 has several liquid crystal molecules 13a. During the phase change of a liquid crystal molecule 13a of the smectic liquid crystal layer 13, the horizontal electrical field generated by applying the AC voltage on the first electrode 17 and the second electrode 18 facilitates the alignment of the liquid crystal molecule 13a of the smectic liquid crystal layer 13.

Before an voltage is applied on the first electrode 17 and the second electrode 18, that is, before a horizontal electrical field is formed between the first electrode 17 and the second electrode 18, the average optical axis of the smectic liquid crystal layer 13 is substantially perpendicular to the first vertical alignment film 19 and the second vertical alignment film 22. Before a voltage is applied on the first electrode 17 and the second electrode 18, that is, before a horizontal electrical field is formed between the first electrode 17 and the second electrode 18, the average optical axis of the liquid crystal molecules 13a of the smectic liquid crystal layer 13 tilts along with the direction of the horizontal electrical field.

The anchoring energy of vertical alignment film is relative to the voltage applied on the LCD panel. When the anchoring energy of the vertical alignment film is stronger, the vertical alignment film provides a strongly anchoring energy to liquid crystal molecules of the liquid crystal layer adjacent to the vertical alignment film, the larger voltage is applied on the LCD panel to rotate the liquid crystal molecules. On the other hand, when the anchoring energy of the vertical alignment film is weaker, the vertical alignment film provides a weakly anchoring energy to liquid crystal molecules of the liquid crystal layer adjacent to the vertical alignment film, the smaller voltage is applied on the LCD panel to rotate the liquid crystal molecules. Based on the premise that the vertical alignment film can vertically align the liquid crystal molecules, the voltage applied on the LCD panel is reduced if the anchoring energy is weakened. In the embodiment, the first vertical alignment film 19 provides a first anchoring energy to liquid crystal molecules 13a of the liquid crystal layer 13 adjacent to the first vertical alignment film 19. The second vertical alignment film 22 provides a second anchoring energy to liquid crystal molecules 13a of the liquid crystal layer 13 adjacent to the second vertical alignment film 22. The first anchoring energy and the second anchoring energy are the combination of a strongly anchoring energy and a weakly anchoring energy. The strongly anchoring energy is stronger than the weakly anchoring energy. For example, the first anchoring energy and the second anchoring energy are the strongly anchoring energy and the weakly anchoring energy, respectively. Otherwise, the first anchoring energy and the second anchoring energy are the weakly anchoring energy and the strongly anchoring energy, respectively. In the embodiment, the first vertical alignment film 19 and the second vertical alignment film 22 have the strongly anchoring energy and the weakly anchoring energy, respectively. The second vertical alignment film 22 with the weakly anchoring energy is obtained by using a rubbing method to treating a vertical alignment film with the strong anchoring energy. The rubbing method is a soft rubbing method. Additionally, the strongly anchoring energy ranges from about $3 \times 10^{-4}$ (J/m$^2$) to about $7 \times 10^{-4}$ (J/m$^2$). The weakly anchoring energy is lower than about $1 \times 10^{-4}$ (J/m$^2$). The anchoring energy is the attraction formed between the electrode on at least one of the first substrate 11 and the second substrate 12 and the liquid crystal molecule of the smectic liquid crystal layer, and the surface of the electrode is non-limit must to be treated by gas, plasma, etchant, solution, bombing, or likes, and the not treated surface of the electrode is also incorporately in the LCD panel, usually the non-treated surface of the electrode on at lest one of the first substrate 11 and the second substrate 12 has the weakly anchoring energy is the attraction with the liquid crystal molecule of the smectic liquid crystal layer. The anchoring energy is also the attraction formed between the alignment film and the liquid crystal molecule of the smectic liquid crystal layer.

The difference of the hard rubbing method and the soft rubbing method is determined by the amount of force on which the bushes of the rubbing roller downwardly press the alignment film. If the force on which the bushes of the rubbing roller downwardly press the alignment film is larger, the grooves on the alignment film is deeper. That is belonged to the hard rubbing method. The horizontal alignment film is obtained by using the hard rubbing method on alignment film. If the force on which the bushes of the rubbing roller downwardly press the alignment film is smaller, the grooves on the alignment film is shallower. That is belonged to the soft rubbing method. The vertical alignment film in the embodiment is obtained by using the soft rubbing method on the alignment film. Therefore, the grooves of the vertical alignment film in the embodiment by soft rubbing method are shallower than the grooves of the horizontal alignment film.

The arrangements of the liquid crystal molecules 13a are described as following when the two vertical alignment films have strongly anchoring energies. Referring to FIG. 2B, a diagram showing the arrangement of the liquid crystal molecules when the first vertical alignment film and the second vertical alignment film have strongly anchoring energies is shown. In FIG. 2B, the smectic liquid crystal layer 13 is disposed between the first vertical alignment film 19 and the second vertical alignment film 22a. The second vertical alignment film 22a provides a second anchoring energy to liquid crystal molecules 13a of the liquid crystal layer 13 adjacent to the second vertical alignment film 22a. When no voltage is applied on the first electrode portion 17B and the second electrode portion 18b, and the two vertical alignment films have different anchoring energies, the arrangements of the liquid crystal molecules 13a are different Especially, the arrangement of the sublayer of the liquid crystal molecules 13a adjacent to the second vertical alignment film 22a is different from other sublayer of the liquid crystal molecules 13a. The longitudinal axes of the sublayer of the liquid crystal molecules 13a adjacent to the second vertical alignment film 22a is substantially perpendicular to the surface of the second vertical alignment film 22a. The longitudinal axes of the sublayer of the liquid crystal molecules 13a adjacent to the second vertical alignment film 22 is substantially inclined to the surface of the second vertical alignment film 22.

Figure 3:
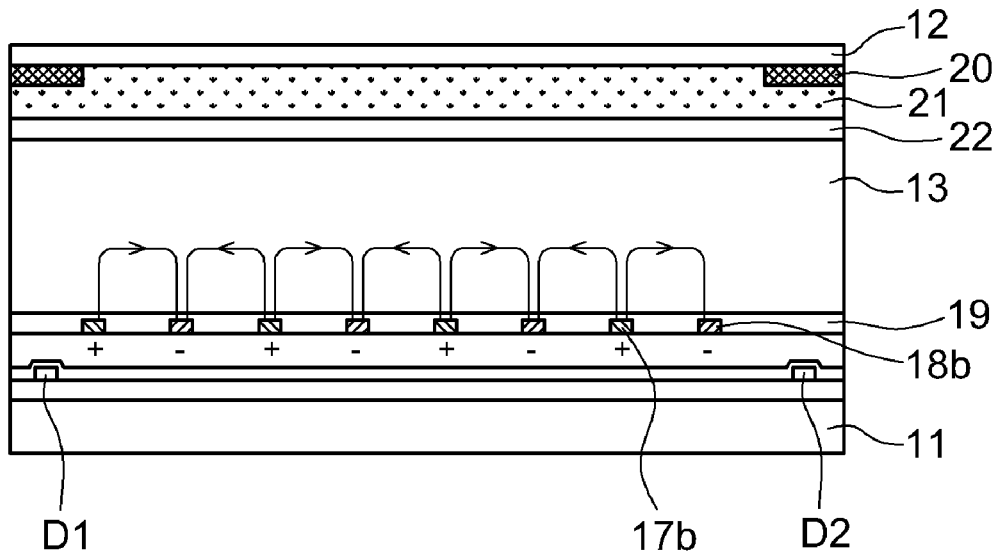
FIGS. 3~4 are two diagrams showing the distribution of the horizontal electrical field formed when an AC voltage is applied on the first electrode and the second electrode of FIG. 2A.
Figure 4:
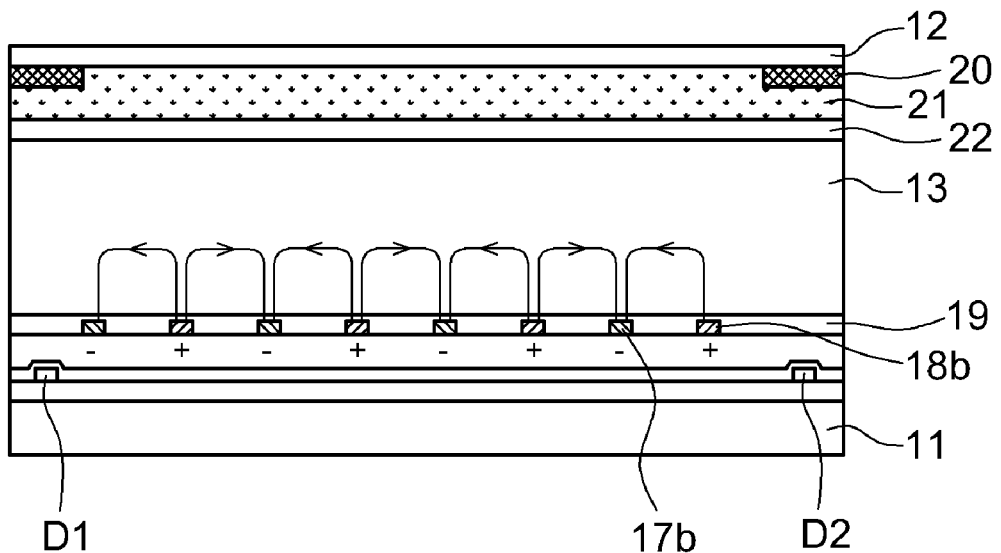

Referring to both FIGS. 3~4, two diagrams showing the distribution of the horizontal electrical field formed when an AC voltage is applied on the first electrode and the second electrode of FIG. 1 are shown. FIG. 3 is also the diagram showing the distribution of the horizontal electrical field formed when an AC voltage is applied on the first electrode and the second electrode of FIG. 2B. As shown in FIGS. 3~4, an AC voltage is applied on the first electrode 17 and the second electrode 18 during the phase change of the liquid crystal molecules 13a of the smectic liquid crystal layer 13 so as to change the polarity of the first electrode 17 and the second electrode 18. If the first electrode 17 and the second electrode 18 respectively have a positive polarity and a negative polarity during a first voltage-applied period, then the first electrode 17 and the second electrode 18 respectively have a negative polarity and a positive polarity during a second voltage-applied period. The polarity of the first electrode 17 and the polarity of the second electrode 18 are switched when an AC voltage is alternately applied during the first voltage-applied period and the second voltage-applied period. Therefore, the directions of the horizontal electrical fields formed between the first electrodes portions 17b and the second electrode portions 18b are all parallel to the surface of the first substrate 11. Moreover, each direction of the horizontal electrical field formed between each first electrode portion 17b and one adjacent second electrode portion 18b is opposite to the direction of the horizontal electrical field formed between the first electrode portion 17b and another adjacent second electrode portion 18b. In terms of a first electrode portion 17b and its adjacent second electrode portion 18b, the direction of the horizontal electrical field formed between the first electrode portions 17b of positive polarity and the second electrode portion 18b of negative polarity during the first voltage period is opposite to the direction of the horizontal electrical field formed between the first electrode portions 17b of negative polarity and the second electrode portion 18b of negative polarity during the second voltage period.

In order to clearly illustrate that the directions of the horizontal electrical fields formed between the first electrodes portions 17b and the second electrode portions 18b are parallel to the surface of the first substrate 11 and that the direction of the horizontal electrical field formed between any of the first electrode portions 17b and its adjacent second electrode portion 18b is opposite to the direction of the horizontal electrical field formed between any of the first electrode portions 17b and its another adjacent second electrode portion 18b, the structure and reference number of the liquid crystal molecules 13a are omitted in FIGS. 3~4. Besides, in FIG. 3, "+" and are respectively and correspondingly labeled below the first electrode portion 17b and the second electrode portion 18b to denote that the first electrode portion 17b and the second electrode portion 18b respectively have a positive polarity and a negative polarity. In FIG. 4, "−" and "+" are respectively and correspondingly labeled below the first electrode portion 17b and the second electrode portion 18b to denote that the first electrode portion 17b and the second electrode portion 18b respectively have a negative polarity and a positive polarity.

Figure 5A:
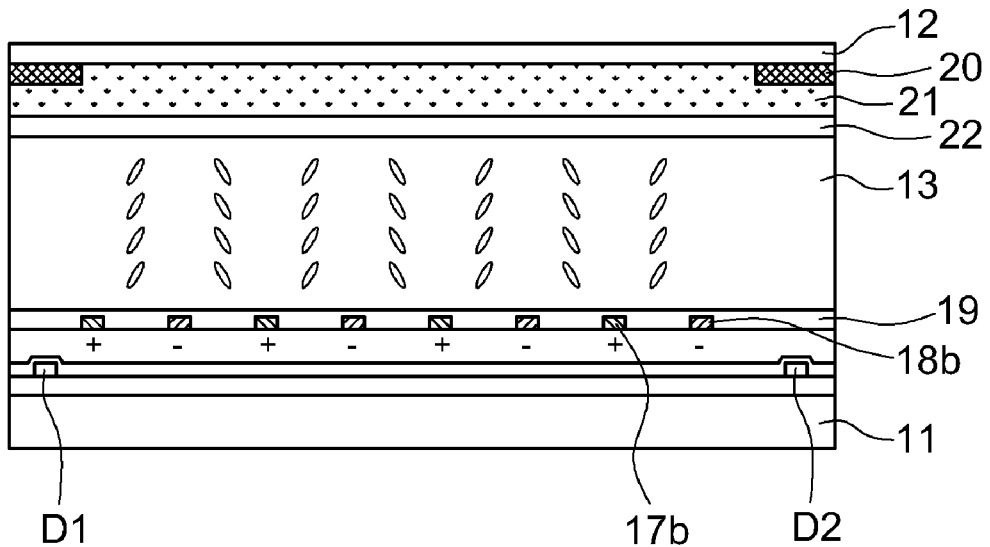
FIG. 5A is diagram showing the vertical rotation of the liquid crystal molecules of FIG. 3 according to the horizontal electrical field formed by the first electrode and the second electrode.
Figure 5B:
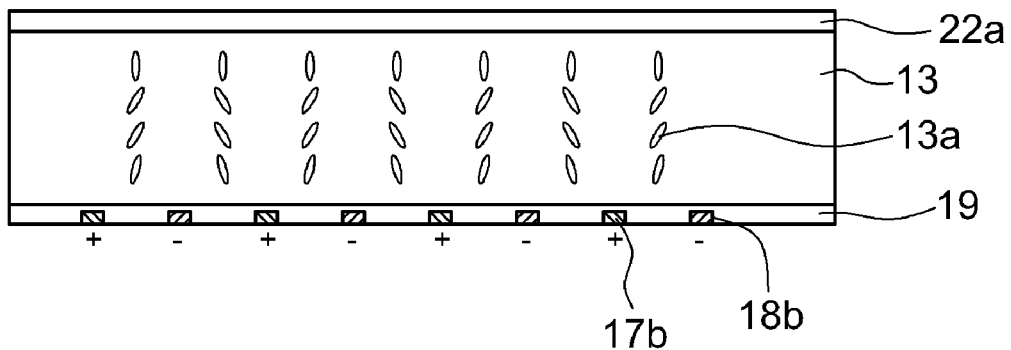
FIG. 5B is diagram showing the vertical rotation of the liquid crystal molecules of FIG. 2B according to the horizontal electrical field formed by the first electrode and the second electrode in FIG. 5A.
Figure 6:
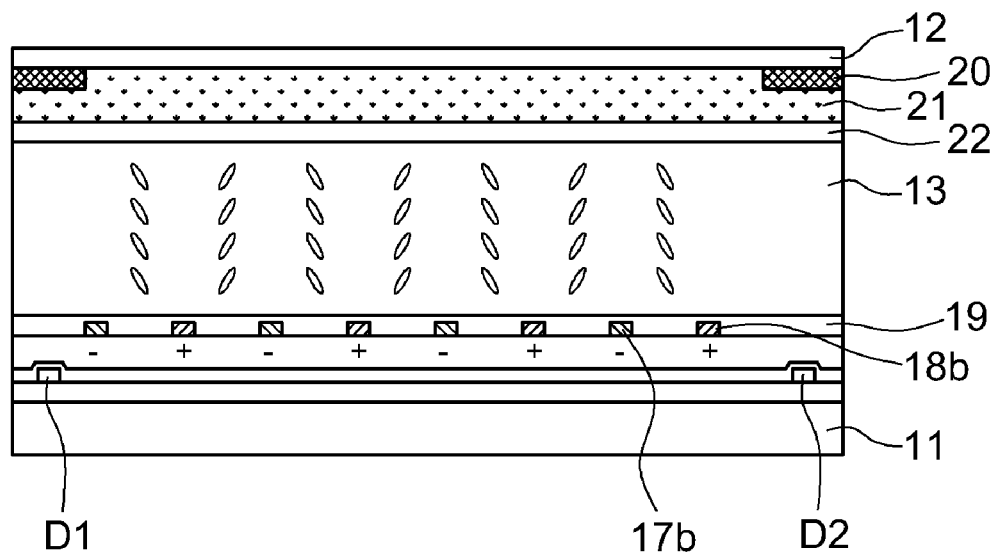
FIG. 6 is diagram showing the vertical rotation of the liquid crystal molecules of FIG. 4 according to the horizontal electrical field formed by the first electrode and the second electrode.

Referring to both FIGS. 5A~6. FIGS. 5A and 6 are two diagrams respectively showing the vertical rotation of the liquid crystal of FIGS. 3~4 according to the horizontal electrical field formed by the first electrode and the second electrode. FIG. 5B is diagram showing the vertical rotation of the liquid crystal molecules of FIG. 2B according to the horizontal electrical field formed by the first electrode and the second electrode in FIG. 5A. As shown in FIGS. 5A and 6, since the directions of the horizontal electrical fields formed between the first electrode portions 17b and the second electrode portions 18b are parallel to the surface of the first substrate 11, each direction of the horizontal electrical field formed between any of the first electrode portions 17b and its adjacent second electrode portion 18b is opposite to the direction of the horizontal electrical field formed between any of the first electrode portions 17b and its another adjacent second electrode portion 18b. The aforementioned horizontal electrical field and profile thereof are also generated by the first electrode portion 17 and the second electrode portion 18b in FIG. 5B. Furthermore, the polarity of the first electrode portion 17b and the polarity of the second electrode portion 18b are switched when alternately applied by an AC voltage during the first voltage-applied period and the second voltage-applied period. Therefore, during the phase change, the liquid crystal molecules 13a of the smectic liquid crystal layer 13 can vertically rotate to form several multi-domains according to the horizontal electrical fields formed between the first electrode portions 17b and the second electrode portions 18b. When the same voltage is applied on the first electrode portion 17b and the second electrode portion 18b in FIGS. 2A~2B, the longitudinal axes of the sublayer of the liquid crystal molecules 13a adjacent to the second vertical alignment film 22a is slightly inclined to the surface of the second vertical alignment film 22a due to the second vertical alignment film 22a with the strongly anchoring energy. The longitudinal axes of the sublayer of the liquid crystal molecules 13a adjacent to the second vertical alignment film 22 is further inclined to the surface of the second vertical alignment film 22 due to the second vertical alignment film 22 with the weakly anchoring energy. If the longitudinal axes of the sublayer of the liquid crystal molecules 13a adjacent to the second vertical alignment film 22a wants to be further inclined to the surface of the second vertical alignment film 22a, the voltage applied on the first electrode portion 17b and the second electrode portion 18b has to be increased.

Figure 7:
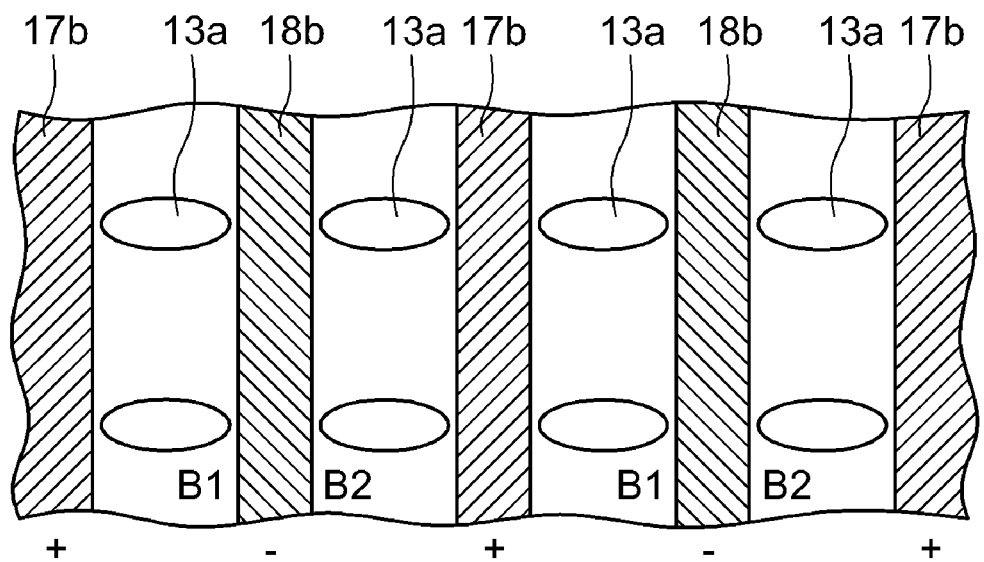
FIG. 7 is an enlarged diagram of the multi-domains formed after the vertical rotation of the liquid crystal molecules of FIG. 5A.

Referring to FIG. 7, an enlarged diagram of the multi-domains formed after the vertical rotation of the liquid crystal molecules of FIG. 5A is shown. As shown in FIG. 7, the liquid crystal molecules 13a of the smectic liquid crystal layer 13 rotates to form multi-domains B1 and B2 according to the horizontal electrical field formed between the first electrode portions 17b and the second electrode portions 18b. In order to clearly illustrate that the liquid crystal molecules 13a of the smectic liquid crystal layer 13 vertically rotates to form multi-domains B1 and B2 according to the horizontal electrical field formed between the first electrode portions 17b and the second electrode portions 18b, the structure and reference number of the first vertical alignment film 19 are omitted in FIG. 7.

However, anyone who is skilled in the technology of the present embodiment of the invention will understand that the technology of the present embodiment of the invention is not limited thereto. For example, the smectic liquid crystal layer 13 includes a ferroelectric liquid crystal (FLC) or an antiferroelectric liquid crystal (AFLC). When the liquid crystal molecules 13a is used as the ferroelectric liquid crystal or the antiferroelectric liquid crystal. Firstly, the liquid crystal molecules 13a of the smectic liquid crystal layer 13 are heated to the isotropic phase. Next, during the cooling process of the liquid crystal molecules 13a of the smectic liquid crystal layer 13, the liquid crystal molecules 13a of the smectic liquid crystal layer 13 will gradually change and crystallize. Meanwhile, during the phase change of the liquid crystal molecules 13a of the smectic liquid crystal layer 13, an AC voltage is applied to facilitate the alignment of the liquid crystal molecules 13a of the smectic liquid crystal layer 13. During the cooling process to achieve the room temperature of 25° C. for instance, the phase of the liquid crystal molecules 13a of the smectic liquid crystal layer 13 is subsequently changed from an isotropic phase, an N* phase, an SmA* phase to an SmC* phase. Afterwards, a polarization microscope is used to observe and ascertain the alignment of the liquid crystal molecules 13a of the smectic liquid crystal layer 13.

Moreover, the first electrode 17 and the second electrode 18 includes a single-layered or multi-layered structure of indium tin oxide (ITO), indium zinc oxide (IZO), cadmium tin oxide (CTO), stannum dioxide (SnO2) or aluminum zinc oxide (AZO). Besides, the first substrate 11 and the second substrate 12 include a glass substrate, a ceramic substrate, an insulating substrate, a flexible substrate or a plastic substrate. Moreover, the LCD 10 further includes a black matrix 20 and a color filter 21. The black matrix 20 corresponds to the non-luminant areas of the active matrix 15, such as a first scan line S1, a second scan line S2, a first data line D1, a second data line D2 or other areas, and is disposed between the second substrate 12 and the second vertical alignment film 22, so that the main transparent parts of the pixel P1, that is, the parts of the pixel P1 on which the first electrode 17 and the second electrode 18 are distributed, are exposed. The color filter 21 is disposed between the second substrate 12 and the second vertical alignment film 22, and is partly overlapped with the edge of the black matrix 20. The color filter 21 corresponds to the main transparent area of the pixel P1 exposed by the black matrix 20.

Although the first electrode portion 17b and the second electrode portion 18b of the present embodiment are exemplified by a strip-shaped structure, the structure of the first electrode portion 17b and the second electrode portion 18b can be W-shaped or V-shaped as long as the first electrode 17 the second electrode 18 can be electrically isolated. Moreover, the second electrode portion 17b and the second electrode portion 18b can be disposed in parallel to the first data line D1 or the first scan line S1. Besides, the second electrode portion 17b and the second electrode portion 18b can further form a contained angle with the first scan line S1 or the first data line D1. The contained angle ranges from 0~90 degrees.

In the present embodiment, the second electrode connecting portion 18a and the second electrode portion 18b can be disposed on different insulation layers of the first substrate 11. For example, the second electrode connecting portion 18a can be disposed below the second electrode portion 18b. The second electrode connecting portion 18a and the second electrode portion 18b distributed on different layers can be electrically connected together through several contact holes passing through one or more insulation layers between the second electrode connecting portion 18a and the second electrode portion 18b.

Besides, the wave pattern of the AC voltage applied to the first electrode 17 and the second electrode 18 can be an AC squared wave alternating among a positive voltage, a zero voltage and a negative voltage. The height or width of the AC squared wave is for determining the transmittance of the LCD panel 10. In addition to the first electrode 17 and the second electrode 18 on which an AC voltage can be applied by an AC power, the active matrix 15 can further include one or several common electrode lines which increase the transmittance of LCD panel 10 by applying a DC voltage. In other words, the AC voltage has an AC squared wave alternating among a positive voltage, a zero voltage, and a negative voltage, and the height or the width of the AC squared wave determines the transmittance of the LCD panel.

The present embodiment adopts the design of applying an AC voltage to facilitate the alignment of the liquid crystal molecules of the smectic liquid crystal layer during the phase change of the liquid crystal molecules of the smectic liquid crystal layer and adopting the liquid crystal vertical alignment, enabling the liquid crystal molecules of the smectic liquid crystal layer to be arranged and aligned uniformly. Therefore, the liquid crystal of the smectic liquid crystal layer is free of zigzag wall defect of arrangement, and the LCD is prevented from light leakage occurring due to the zigzag wall. Consequently, the contrast of LCD is largely enhanced.

Moreover, the LCD panel of the present embodiment uses the positive and the negative electrodes alternately spaced on the same substrate generate the positive and the negative horizontal electrical fields parallel to the surface of the substrate and further incorporates the design of liquid crystal vertical alignment to achieve vertical rotation of multi-domains and liquid crystals. Therefore, the view angle is improved and widened.

Besides, the present embodiment uses the height or width of the drive AC squared wave to control the transmittance of LCD panel and incorporates the manufacturing technology of LCD panel without using conventional gray level display methods such as pixel area singulating method, frame time singulating method and drive voltage singulating method, thereby avoiding the problems arising when conventional gray level display methods are adopted.

Moreover, the LCD panel of the present embodiment adopts the design of liquid crystal vertical alignment, so the smectic liquid crystal layer of the invention is thicker than the smectic liquid crystal layer of a conventional FLC display panel, not only increasing the cell gap between the top and the bottom substrates as well as the flexibility in the design of he surface of the substrate, but also simplifying the manufacturing technology of LCD panel.

Furthermore, the LCD panel of the present embodiment adopts the design of dual vertical alignment with a strongly anchoring energy and a weakly anchoring energy, single vertical alignment or polymer network inside the smectic liquid crystal layer, so the voltage applied on the LCD panel is apparently reduced.

Second Embodiment

Figure 8A:
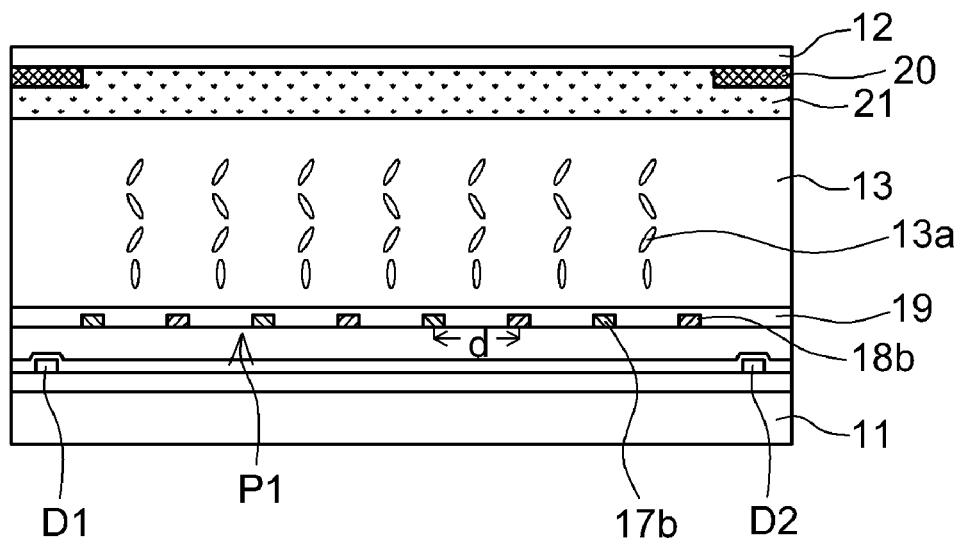
FIGS. 8A~8B are diagrams showing partial cross-sectional structure of an LCD panel according a second embodiment of the present invention.
Figure 8B:
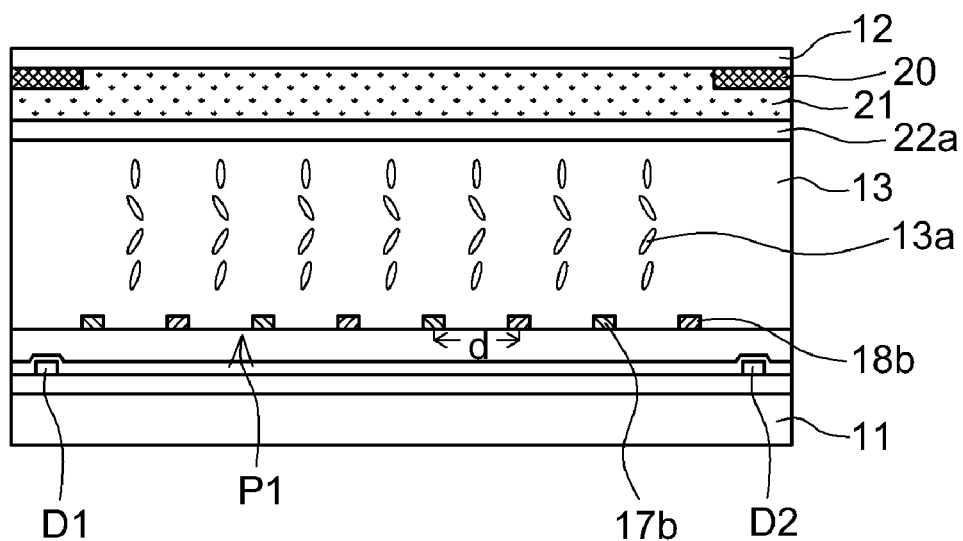

Referring to FIGS. 8A~8B, two diagrams showing partial cross-sectional structure of an LCD panel according a second embodiment of the invention are shown. The LCD panels 10a~10b of the present embodiment differ with the LCD panel 10 of the first embodiment in that the LCD panels 10a~10b only have one vertical alignment film, respectively. As for other similar components, the same reference numbers are used and are not repeated here.

As shown in FIG. 8A, the LCD panel 10a only has the first vertical alignment 19 with the strongly anchoring energy, but doesn't have the second vertical alignment 22. The anchoring energy which the second substrate 12 provides to the smectic liquid crystal 13 almost equals zero, even equals zero. Therefore, the sublayer of the liquid crystal molecules 13a of the smectic liquid crystal layer 13 adjacent to the second substrate 12 is further inclined to the surface of the second substrate 12. That is different from FIG. 2A.

As shown in FIG. 8B, the LCD panel 10b only has the second vertical alignment 22a with the strongly anchoring energy, but doesn't have the first vertical alignment 19. The anchoring energy which the first substrate 11 provides to the smectic liquid crystal 13 almost equals zero, even equals zero. Therefore, the sublayer of the liquid crystal molecules 13a of the smectic liquid crystal layer 13 adjacent to the second substrate 12 is further inclined to the surface of the first substrate 11. That is different from FIG. 2B.

Figure 9A:
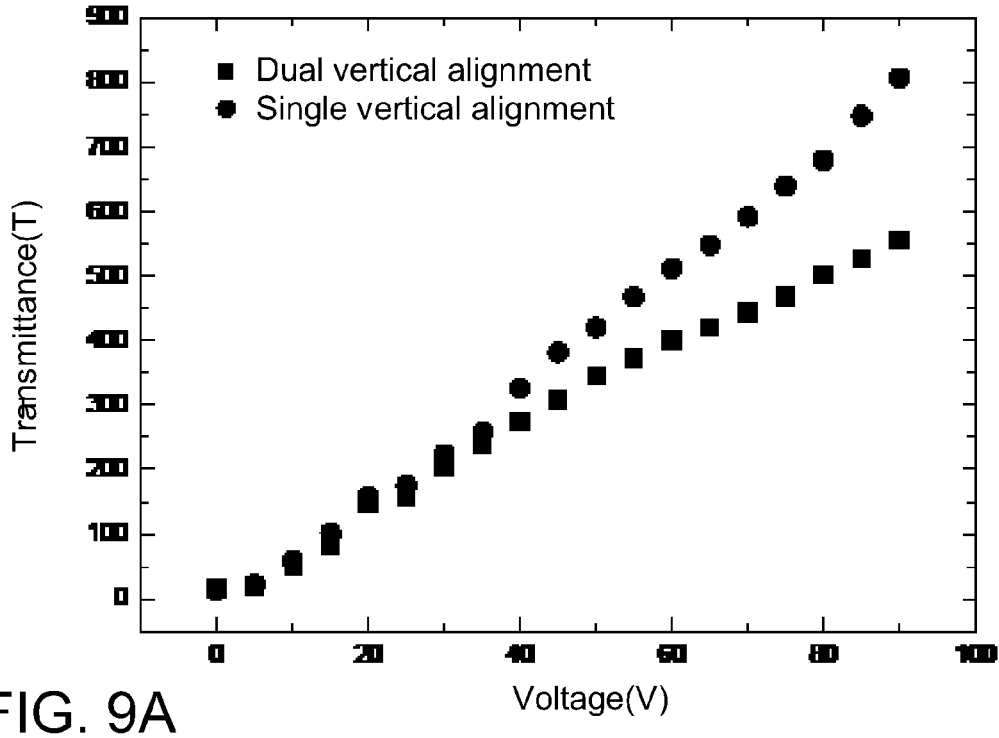
FIG. 9A is a diagram showing the relative curves of the voltage and the transmittance in the LCD panel when the LCD panel has dual vertical alignment and single vertical alignment.

Referring to FIG. 9A, a diagram showing the relative curves of the voltage and the transmittance in the LCD panel when the LCD panel has dual vertical alignment and single vertical alignment is shown. As shown in FIG. 9A, the meaning of the dual vertical alignment is that the bottom surface and the top surface of the smectic liquid crystal layer 13 have a vertical alignment film with a strongly anchoring energy disposed thereon, respectively. The dual vertical alignment is also shown in FIG. 2B. That is to say, FIG. 2B is the diagram showing the situation when the LCD panel has the dual vertical alignment. The meaning of the single vertical alignment is that one of the bottom surface and the top surface of the smectic liquid crystal layer 13 has a vertical alignment film with a strongly anchoring energy disposed thereon. In the LCD panel of the embodiment, the predetermined distance d formed between the first electrode portion 17b and the second electrode portion 18b substantially equals 7 micrometers (μm). The cell gap of the LCD panel of the embodiment substantially equals 6 μm. For example, the smectic liquid crystal layer 13 is CS-1030 type liquid crystal manufactured by Chisso Co., Ltd. As shown in FIG. 9A, the transmittance of the LCD panel with dual vertical alignment is larger than the transmittance of the LCD panel with single vertical alignment when the same voltage is applied on the LCD panels with dual vertical alignment and the LCD panels with single vertical alignment, respectively. That is to say, the voltage applied on the LCD panels with single vertical alignment is smaller than the voltage applied on the LCD panels with dual vertical alignment when the LCD panels with dual vertical alignment and single vertical alignment have the same transmittance. Therefore, the design of the LCD panel incorporating the signal vertical alignment facilitates the LCD panel in reducing the voltage needed.

Figure 9B:
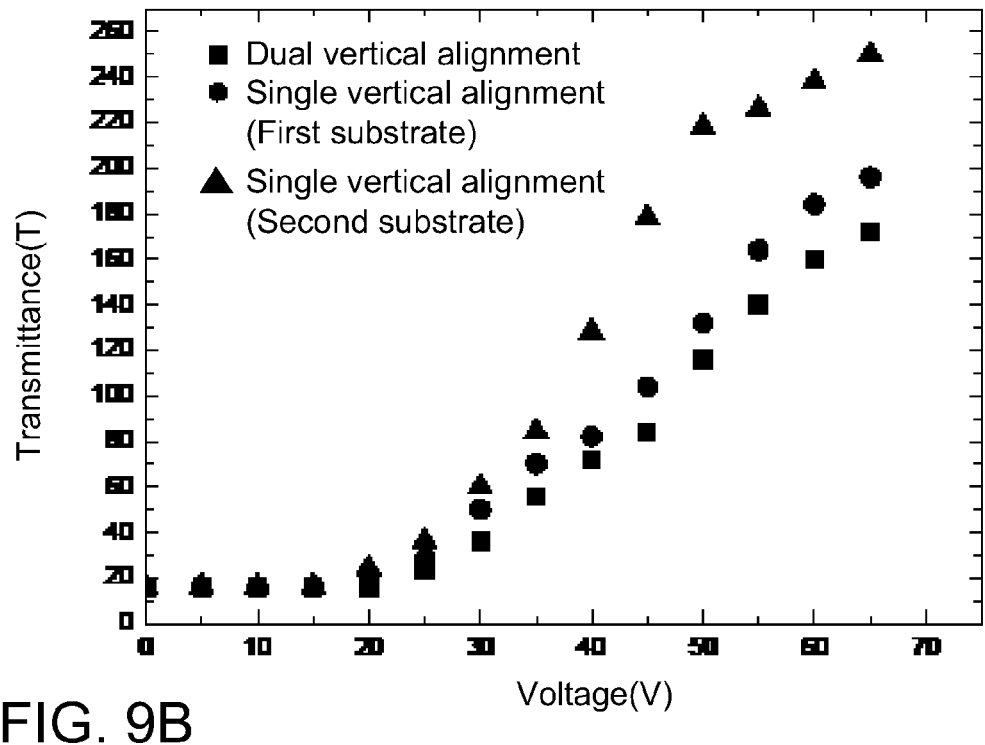
FIG. 9B is a diagram showing the relative curves of the voltage and the transmittance in the LCD panel when the LCD panel has dual vertical alignment, single vertical alignment on the first substrate and single vertical alignment on the second substrate.

Referring to FIG. 9B, a diagram showing the relative curves of the voltage and the transmittance in the LCD panel when the LCD panel has dual vertical alignment, single vertical alignment on the first substrate and single vertical alignment on the second substrate is shown. In the LCD panel of the embodiment, the predetermined distance d formed between the first electrode portion 17b and the second electrode portion 18b substantially equals 7 μm. The cell gap of the LCD panel of the embodiment substantially equals 6 μm. For example, the smectic liquid crystal layer 13 is FLC:10855 type liquid crystal manufactured by Rolic Co., Ltd. As shown in FIGS. 2B, 8A and 9A, the transmittance of the LCD panel 10b with single vertical alignment on the second substrate 12 is larger than the transmittance of the LCD panel 10a with single vertical alignment on the first substrate 11 when the same voltage is applied on the LCD panels 10a and 10b, respectively. The transmittance of the LCD panel 10a with single vertical alignment on the first substrate 11 is larger than the transmittance of the LCD panel with dual vertical alignment when the same voltage is applied on the LCD panel 10a and the LCD panel with dual vertical alignment, respectively. The voltage applied on the LCD panel 10b with single vertical alignment on the second substrate 12 is smaller than the voltage applied on the LCD panel 10a with single vertical alignment on the first substrate 11 when the LCD panels 10a and 10b have the same transmittance. The voltage applied on the LCD panel 10a with single vertical alignment on the first substrate 11 is smaller than the voltage applied on the LCD panel with dual vertical alignment when the LCD panels 10a and the LCD panel with dual vertical alignment have the same transmittance. Therefore, the design of the LCD panel incorporating the signal vertical alignment on the second substrate further facilitates the LCD panel in reducing the voltage needed.

In the embodiment, the LCD panel further includes a polymer network disposed inside the smectic liquid crystal layer to reduce the voltage applied on the LCD panel. The two vertical alignment films may have strongly anchoring energy. Or, one vertical alignment film may have a strongly anchoring energy, and another vertical alignment film may have a weakly anchoring energy. The polymer network may be formed by the polymerization of the reactive monomers inside the smectic liquid crystal layer. The monomer can be photosensitive monomer or thermosensitive monomer. The monomers can be polymerized to form the polymer network by using an irradiating method, a heating method or the combination thereof. Furthermore, the monomers can be polymerized to form the polymer network by using the irradiating method before using the heating method. However, the monomer can be polymerized to form the polymer network by using the irradiating method after using the heating method. The photosensitive monomers inside the smectic liquid crystal layer may be polymerized to form the polymer network by irradiating the ultra violet (UV) ray, heating or the aforementioned combination method. In the embodiment, the monomers (such as photosensitive monomer) can react to polymerize after irradiating the ultra violet (UV) ray, such that the polymer networks are formed and use their branch chains to couple with the two vertical alignment films. The photosensitive monomers amount to 0.1 wt%~20 wt% of the smectic liquid crystal layer 13. The photosensitive monomer comprises benzene having hydrocarbon and fluoride, or biphenyl having hydrocarbon and fluoride. Moreover, the fluoride of the photosensitive monomer includes M fluorine atoms, where M is an integer ranging from 0 to 8. Moreover, the photosensitive monomer uses a linear aliphatic hydrocarbon chain as the linking group. The chemical formula of the linear aliphatic hydrocarbon chain is expressed as $(CH_2)_n$, where n is an integer ranging from 0 to 22. The above disclosed photosensitive monomer can be the monomer expressed in chemical formulae [1] and [2]:

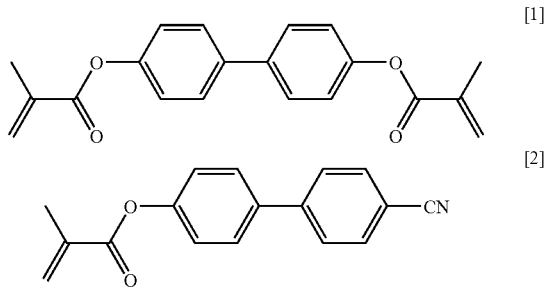

Third Embodiment

Figure 10:
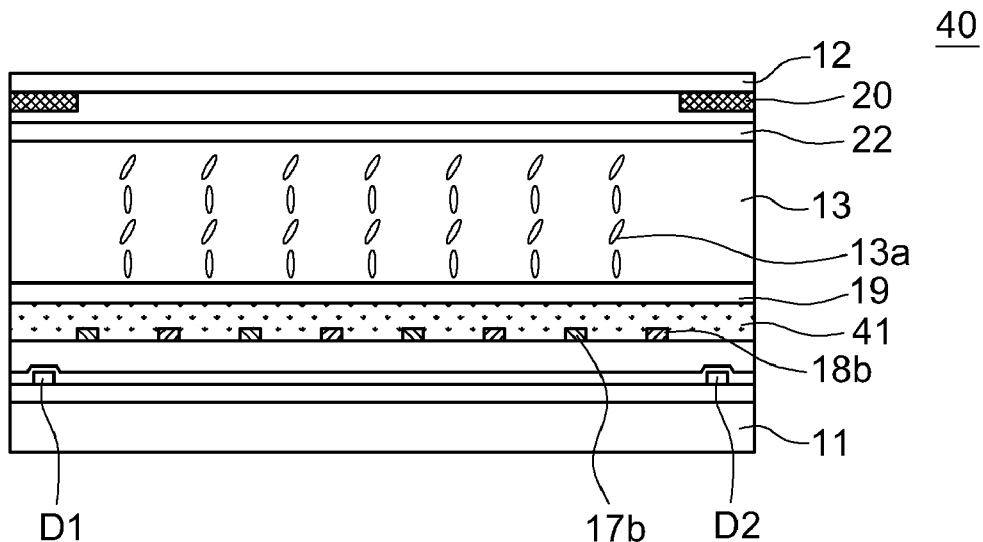
FIG. 10 is a diagram showing partial cross-sectional structure of an LCD panel according to a third embodiment of the present invention.

Referring to FIG. 10, a diagram showing partial cross-sectional structure of an LCD panel according to the third embodiment of the invention is shown. The LCD panel 40 of the present embodiment differs with the LCD panel 10 of the first embodiment in the position of the color filter 41. As for other similar components, the same reference numbers are used and are not repeated here.

As shown in FIG. 10, the color filter 41 is disposed between the first substrate 11 and the first vertical alignment film 19. In the present embodiment, the color filter 41 covers the first electrode 17 and the second electrode 18. The color filter 41 covers the first electrode portions 17b of the first electrode 17 and the second electrode portions 18b of the second electrode 18. The first vertical alignment film 19 covers the color filter 41. Moreover, the color filter 41 can be achieved according to the color filter on array (COA) manufacturing process of LCD. Besides, there is no need to dispose a color filter between the second substrate 12 and the second vertical alignment film 22, and the second vertical alignment film 22 cover the black matrix 20 and part of the second substrate 12 directly. Moreover, an insulation layer or a passivation layer can be disposed between the second substrate 12 and the second vertical alignment film 22. The insulation layer or the passivation layer covers the black matrix 20 and part of the second substrate 12.

Furthermore, the LCD panel 40 of the present embodiment adopts the design of dual vertical alignment with a strongly anchoring energy and a weakly anchoring energy, single vertical alignment or polymer network inside the smectic liquid crystal layer, so the voltage applied on the LCD panel 40 is apparently reduced.

Fourth Embodiment

Figure 11:
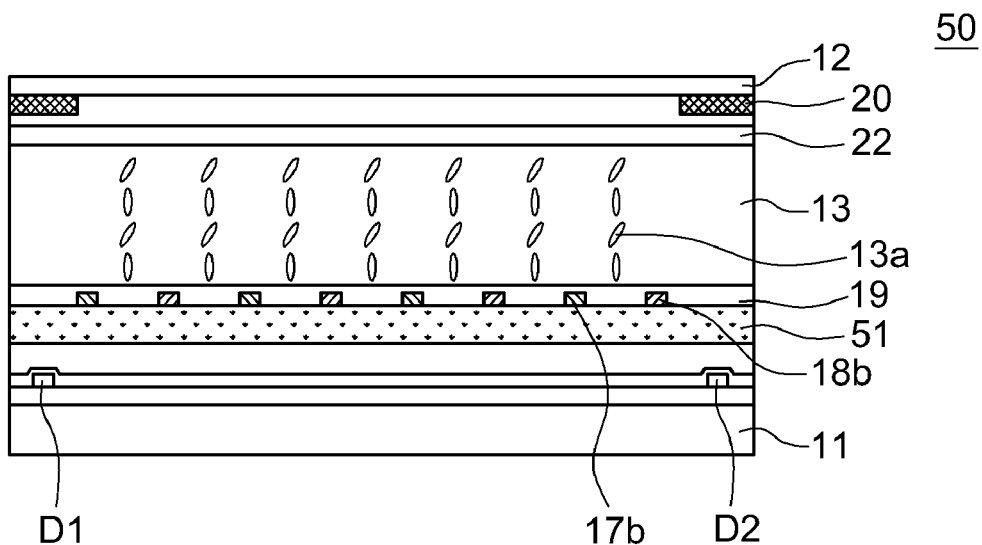
FIG. 11 is a diagram showing partial cross-sectional structure of an LCD panel according to a fourth embodiment of the present invention.

Referring to FIG. 11, a diagram showing partial cross-sectional structure of an LCD panel according to the fourth embodiment of the invention is shown. The LCD panel 50 of the present embodiment differs with the LCD panel 40 of the third embodiment in the position of the color filter 51. As for other similar components, the same reference numbers are used and are not repeated here.

As shown in FIG. 11, the first electrode 17 and the second electrode 18 cover part of the color filter 51 and expose another part of the color filter 51. The first electrode portion 17b of the first electrode 17 and the second electrode portion 18b of the second electrode 18 cover part of the color filter 51 and expose another part of the color filter 51. The first vertical alignment film 19 covers the first electrode 17 and the second electrode 18 and another part of the color filter 51. The first vertical alignment film 19 covers the first electrode portion 17b of the first electrode 17, the second electrode portion 18b of the second electrode 18, and another part of the color filter 51. Moreover, the color filter 51 can be achieved according to the color filter on array (COA) manufacturing process of LCD. Besides, there is no need to dispose a color filter between the second substrate 12 and the second vertical alignment film 22, and the second vertical alignment film 22 can cover the black matrix 20 and part of the second substrate 12 directly. Moreover, an insulation layer or a passivation layer can be disposed between the second substrate 12 and the second vertical alignment film 22. The insulation layer or the passivation layer covers the black matrix 20 and part of the second substrate 12. Furthermore, the LCD panel 50 of the present embodiment adopts the design of dual vertical alignment with a strongly anchoring energy and a weakly anchoring energy, single vertical alignment or polymer network inside the smectic liquid crystal layer, so the voltage applied on the LCD panel 50 is apparently reduced.

Fifth Embodiment

Figure 12:
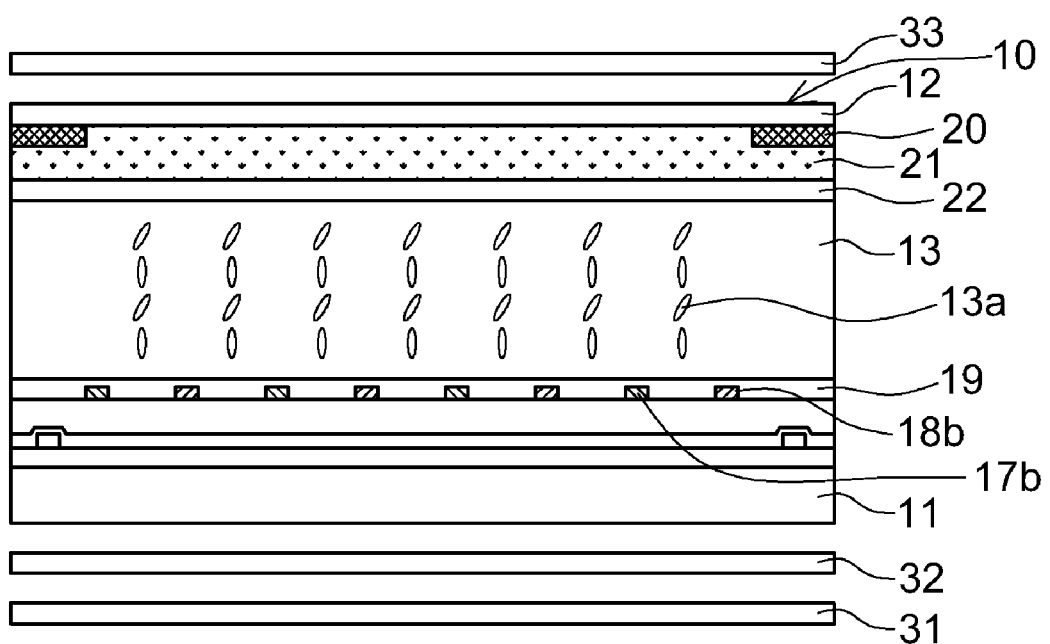
FIG. 12 is a diagram showing partial cross-sectional structure of an LCD according to a fifth embodiment of the present invention.

Referring to FIG. 12, a diagram showing partial cross-sectional structure of an LCD according to the fifth embodiment of the invention is shown. In FIG. 12, the LCD 30 includes a backlight module 31, a first polarizer 32, a second polarizer 33 and the LCD panels 10, 10a, 10b, 40 or 50 disclosed in above embodiments. The LCD panel of the present embodiment can adopt the design of dual vertical alignment with a strongly anchoring energy and a weakly anchoring energy, single vertical alignment or polymer network inside the smectic liquid crystal layer. The present embodiment is exemplified by the LCD panel 10 disclosed in the first embodiment. However, the technology of the present embodiment is not limited thereto. The first polarizer 32 and the second polarizer 33 are disposed on the backlight module 31, and the LCD panel 10 is disposed between the first polarizer 32 and the second polarizer 33. The first polarizer 32 and the second polarizer 33 are respectively disposed on the outer surfaces of the first substrate 11 and the second substrate 12. Moreover, the optical transmission axial direction of the first polarizer 32 is perpendicular to the optical transmission axial direction of the second polarizer 33. The optical transmission axial direction of the first polarizer 32 and that of the second polarizer 33 substantially contain an angle of 45 degrees with the direction of the horizontal electrical field formed between any of the first electrode portions 17b and its adjacent second electrode portion 18b.

When the LCD 30 displays a frame in a time interval frequency of 60 Hz to 1 kHz, the wave pattern of the drive voltage of the first electrode 17 and the second electrode 18 can be a squared wave alternating among a positive voltage, a zero voltage and a negative voltage. The average value of the squared wave within a time interval is zero. The time width of the above positive squared wave and the time width of the negative squared wave are both larger than the rising time (Tr) of the liquid crystal molecules 13a with respect to an applied voltage, and the time width of the zero voltage is smaller than the decay time (Td) of the liquid crystal molecules 13a with respect to an applied voltage.

However, anyone who is skilled in the technology of the present embodiment of the invention will understand that the technology of the present embodiment of the invention is not limited thereto. For example, the backlight module 31 includes a light source. The light source has a red (R) light, a green (G) light and a blue (B) light. Moreover, the light source of the backlight module 31 can simultaneously emit the red light, the green light and the blue light, or sequentially emit the red light, the green light and the blue light. Besides, the LCD 30 is applicable to a computer monitor, a flat screen TV, a monitor screen, a mobile phone, a handy gaming device, a digital camera (DC), a digital video (DV), a digital play device, a personal digital assistant (PDA), a notebook or a Table PC.

Sixth Embodiment

Figure 13:
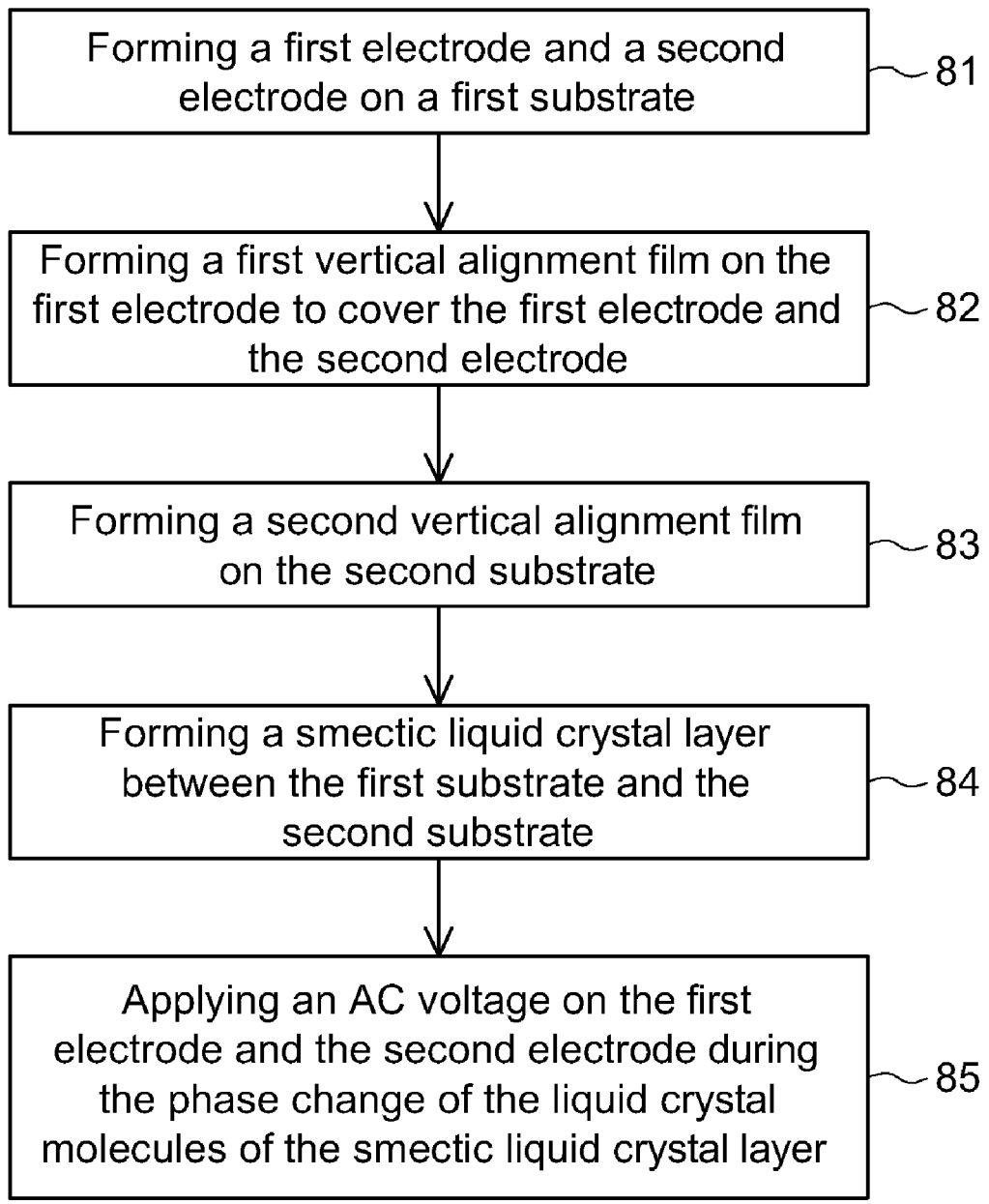
FIG. 13 is a flowchart of a method for manufacturing an LCD panel according to a sixth embodiment of the present invention.

Referring to FIG. 13, a flowchart of a method for manufacturing an LCD panel according to a sixth embodiment of the invention is shown. Please refer to FIGS. 1~2A at the same time. Firstly, the step 81 is proceeded. A first electrode 17 and a second electrode 18 are formed on a first substrate 11. The first electrode 17 and the second electrode 18 have several first electrode portions 17b and several second electrode portions 18b, respectively. The second electrode portions 18b are inter-spaced by the first electrodes 18b. A predetermined distance d is formed between each second electrode portion 18b and the adjacent first electrode portion 17b. Then, the step 82 is proceeded. A first vertical alignment film is formed on the first substrate 11 so as to cover the first electrode 17 and the second electrode 18. Sequentially, the step 83 is proceeded. A second vertical alignment film is formed on a second substrate 12. Then, the step 84 is proceeded. A smectic liquid crystal layer 13 is interposed between the first substrate 11 and the second substrate 12. Afterward, the step 85 is proceeded. An AC voltage is applied on the first electrode 17 and the second electrode 18 to generate a horizontal electrical field for facilitating the alignment of the liquid crystal molecule 13a of the smectic liquid crystal layer 13 during the phase change of the liquid crystal molecule 13a of the smectic liquid crystal layer 13, as shown in FIGS. 3~4.

However, prior to the step 84, the step 83 can be proceeded before the step 81. Furthermore, the step 83 can be proceeded between the steps 81 and 82.

If the first vertical alignment film and the second vertical alignment have the anchoring energies, such as the first vertical alignment film is the first vertical alignment film 19, a sub-step of treating the first vertical alignment film by using a first rubbing method can be proceeded between the steps 82 and 84. Furthermore, the aforementioned first rubbing method can be a soft rubbing method. However, a sub-step of treating the second vertical alignment film by using a second rubbing method can be proceeded between the steps 82 and 84. Furthermore, the aforementioned second rubbing method can be a soft rubbing method.

Seventh Embodiment

Figure 14:
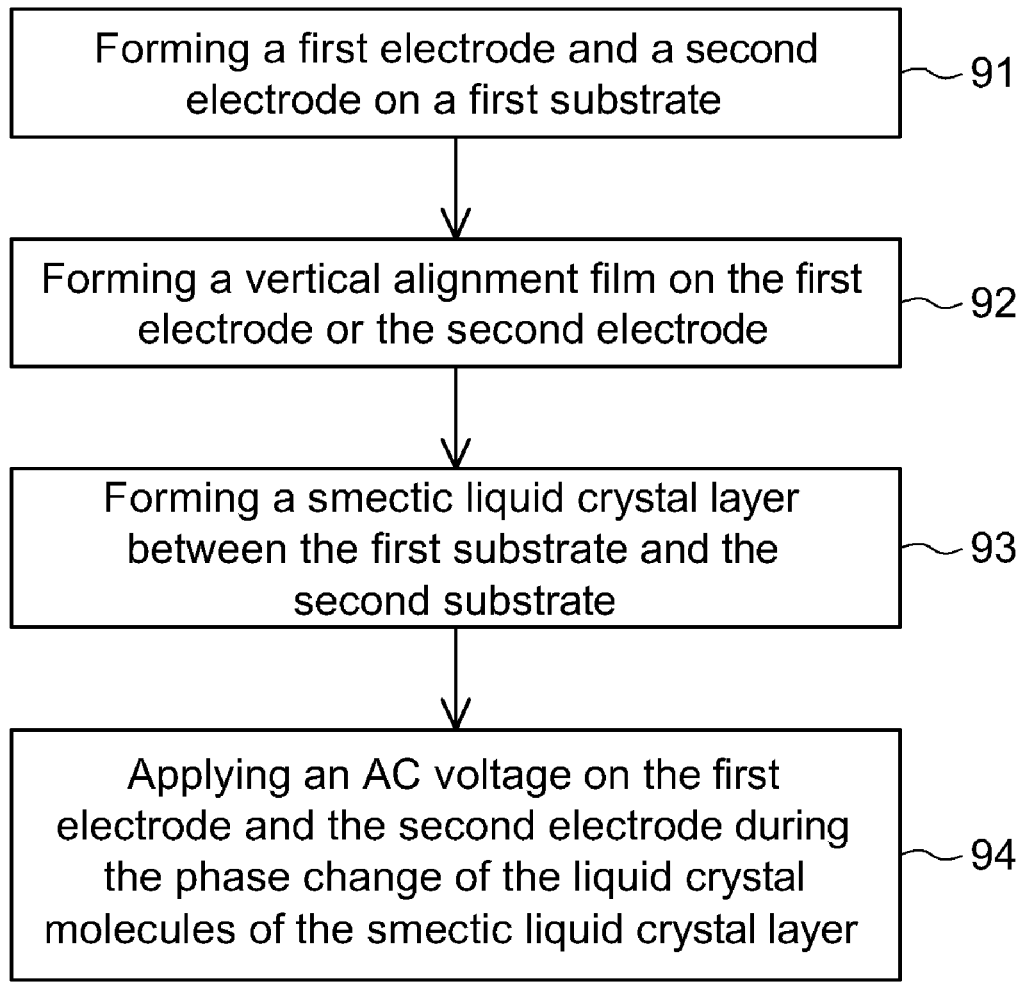
FIG. 14 is a flowchart of a method for manufacturing an LCD panel according to a seventh embodiment of the present invention.

Referring to FIG. 14, a flowchart of a method for manufacturing an LCD panel according to a seventh embodiment of the invention is shown. Please refer to FIGS. 1, 8A~8B at the same time. Firstly, the step 91 is proceeded. A first electrode 17 and a second electrode 18 are formed on a first substrate 11. The first electrode 17 and the second electrode 18 have several first electrode portions 17b and several second electrode portions 18b, respectively. The second electrode portions 18b are inter-spaced by the first electrodes 18b. A predetermined distance d is formed between each second electrode portion 18b and the adjacent first electrode portion 17b. Then, the step 92 is proceeded. A vertical alignment film is formed at least one the first substrate 11 and a second substrate 12. The vertical alignment film formed on the first substrate 11 covers the first electrode 17 and the second electrode 18. Sequentially, the step 93 is proceeded. A smectic liquid crystal layer 13 is interposed between the first substrate 11 and the second substrate 12. Afterward, the step 94 is proceeded. An AC voltage is applied on the first electrode 17 and the second electrode 18 to generate a horizontal electrical field for facilitating the alignment of the liquid crystal molecule 13a of the smectic liquid crystal layer 13 during the phase change of the liquid crystal molecule 13a of the smectic liquid crystal layer 13, as shown in FIGS. 3~4.

However, prior to the step 93, the step 92 must be proceeded after the step 91 if the vertical alignment film are formed on the first substrate 11 to cover the first electrode 17 and the second substrate 18 in the step 92.

Furthermore, prior to the step 93, the step 92 can be proceeded before the step 91 if the vertical alignment film are formed on the second substrate 12 in the step 92.

The vertical alignment film is formed on the first substrate 11, such as the first vertical alignment film 19 with the strongly anchoring energy is formed on the substrate 11, and the second substrate 12 doesn't have any vertical alignment film disposed thereon. However, the vertical alignment film is formed on the second substrate 12, such as the second alignment film 22a is formed on the second substrate 12, and the first substrate 11 doesn't have any vertical alignment film disposed thereon.

The LCD panel and an LCD incorporating the same disclosed in above embodiments of the invention adopts the design of applying an AC voltage to facilitate the alignment of the liquid crystal molecules of the smectic liquid crystal layer during the phase change of the liquid crystal molecules of the smectic liquid crystal layer and adopting the liquid crystal vertical alignment, enabling the liquid crystal molecules of the smectic liquid crystal layer to be arranged and aligned uniformly. Therefore, the liquid crystal of the smectic liquid crystal layer is free of zigzag wall defect of arrangement, and the LCD panel is prevented from light leakage occurring due to the zigzag wall. Consequently, the contrast of LCD panel is largely enhanced.

Moreover, the LCD panel of the present embodiment uses the positive and the negative electrodes alternately spaced on the same substrate generate the positive and the negative horizontal electrical fields parallel to the surface of the substrate and further incorporates the design of liquid crystal vertical alignment to achieve vertical rotation of multi-domains and liquid crystals. Therefore, the view angle is improved and widened.

Besides, the present embodiment uses the height or width of the drive AC squared wave to control the transmittance of LCD panel and incorporates the manufacturing technology of LCD panel without using conventional gray level display methods such as pixel area singulating method, frame time singulating method and drive voltage singulating method, thereby avoiding the problems arising when conventional gray level display methods are adopted.

Moreover, the LCD panel of the present embodiment adopts the design of liquid crystal vertical alignment, so the smectic liquid crystal layer of the invention is thicker than the smectic liquid crystal layer of a conventional FLC display panel, not only increasing the cell gap between the top and the bottom substrates as well as the flexibility in the design of he surface of the substrate, but also simplifying the manufacturing technology of LCD panel.

The LCD panel of the aforementioned embodiments adopts the design of dual vertical alignment with a strongly anchoring energy and a weakly anchoring energy, single vertical alignment or polymer network inside the smectic liquid crystal layer.

While the invention has been described by way of example and in terms of a preferred embodiment, it is to be understood that the invention is not limited thereto. On the contrary, it is intended to cover various modifications and similar arrangements and procedures, and the scope of the appended claims therefore should be accorded the broadest interpretation so as to encompass all such modifications and similar arrangements and procedures.

What is claimed is:

1. A method for manufacturing a liquid crystal display panel, comprising:
    forming a first electrode and a second electrode on a first substrate, wherein the first electrode and the second electrode have a plurality of first electrode portions and a plurality of second electrode portions, respectively, each second electrode portion is inter-spaced by each first electrode portion and each second electrode portion and the adjacent first electrode portion is separated by a predetermined distance;
    forming only one vertical alignment film on at least one the first substrate and a second substrate;
    wherein the only one vertical alignment film, wherein the only one vertical alignment film is only disposed on one of the first substrate which the first electrode portions and the second electrode portions are disposed on
    interposing a smectic liquid crystal layer between the first substrate and the second substrate; and
    applying an AC voltage on the first electrode and the second electrode to generate a horizontal electrical field so as to facilitating the alignment of a liquid crystal molecule of the smectic liquid crystal layer during the phase change of the liquid crystal molecule of the smectic liquid crystal layer.

2. The LCD panel according to claim 1, wherein the vertical alignment film is disposed on the second substrate, wherein the vertical alignment film provides a second anchoring energy to the liquid crystal molecule of the smectic liquid crystal layer adjacent to the vertical alignment film.

3. The LCD panel according to claim 1, wherein the second anchoring energy comprises a strongly anchoring energy.

4. The LCD panel according to claim 1, wherein during the phase change of the liquid crystal molecule of the smectic liquid crystal layer, the horizontal electrical field generated by applying an AC voltage on the first electrode and the second electrode facilitates the alignment of the liquid crystal molecule of the smectic liquid crystal layer.

* * * * *